United States Patent
Yanagiuchi et al.

(10) Patent No.: US 6,735,056 B2
(45) Date of Patent: May 11, 2004

(54) ELECTRON DEVICE COMPOSED OF LAMINATED LAYERS WITH A REGION BETWEEN TWO OF THE LAYERS COMPOSED OF METAL OR METAL ALLOY SELECTED TO BE A COMBINATION OF MATERIALS FROM WHICH THE LAYERS ARE MADE WITH A COVER FILM OVER END FACES OF THE LAYERS

(75) Inventors: Katsuaki Yanagiuchi, Tokyo (JP); Wakako Shiramura, Tokyo (JP)

(73) Assignee: TDK Corporation, Tokyo (JP)

( * ) Notice: Subject to any disclaimer, the term of this patent is extended or adjusted under 35 U.S.C. 154(b) by 207 days.

(21) Appl. No.: 10/122,380

(22) Filed: Apr. 16, 2002

(65) Prior Publication Data

US 2002/0159202 A1 Oct. 31, 2002

(30) Foreign Application Priority Data

Apr. 18, 2001 (JP) ........................................ 2001-120028

(51) Int. Cl.$^7$ ................................................. G11B 5/39
(52) U.S. Cl. .................................... 360/313; 360/324.1
(58) Field of Search .................................. 360/313–328

(56) References Cited

U.S. PATENT DOCUMENTS

| | | | | |
|---|---|---|---|---|
| 4,665,007 A | * | 5/1987 | Cservak et al. | 430/311 |
| 5,795,663 A | * | 8/1998 | Koike et al. | 428/692 |

* cited by examiner

Primary Examiner—A. J. Heinz
(74) Attorney, Agent, or Firm—Oliff & Berridge, PLC

(57) ABSTRACT

An electron device includes a first layer formed of a metal or metal alloy and a second layer adjoining the first layer and formed of a metal or metal alloy different from that of the first layer. In the region adjacent the first layer and the second layer, there is provided a concentration gradient layer formed of a mixture containing a metal or metal alloy contained in the first layer and a metal or metal alloy contained in the second layer. A covering film covers end faces of the first and second layers. With this arrangement, when a cleaning as by etching is carried out on the end faces of the multilayered film structure of the electron device, the end faces are etched in relatively smoothly connected surfaces because of the etched end face of the concentration gradient layer in a gentle slope, so that coverage of the covering film on the end faces of the multilayered film structure can be improved to increase the adherence strength of the covering film.

15 Claims, 13 Drawing Sheets

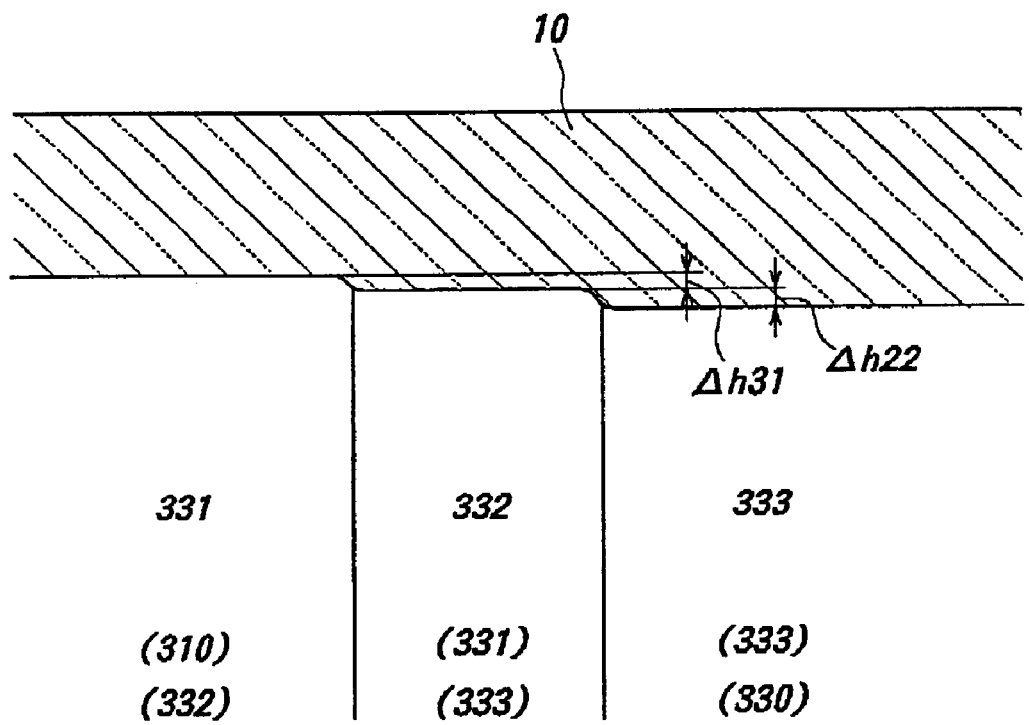
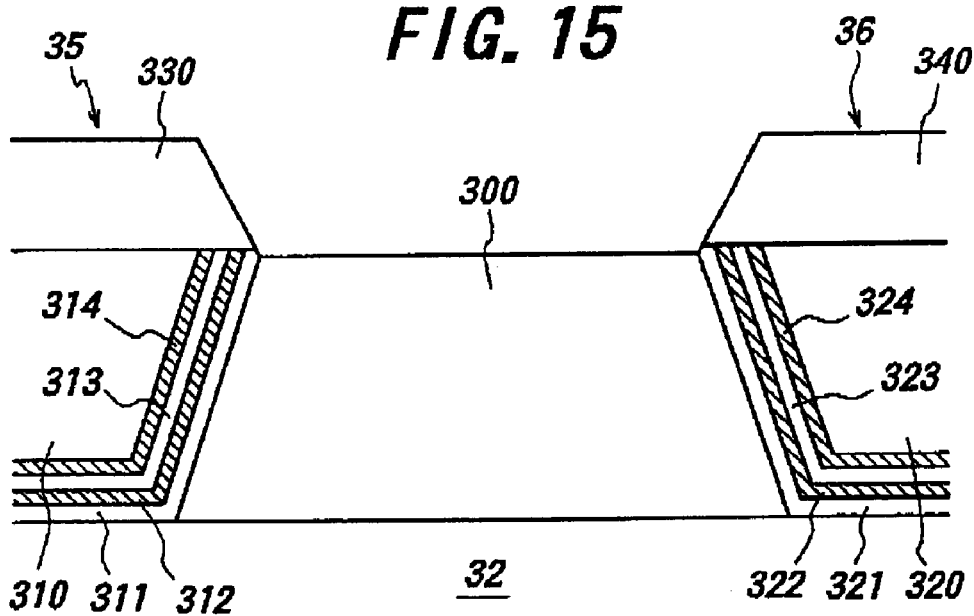

ELECTRON DEVICE COMPOSED OF
LAMINATED LAYERS WITH A REGION
BETWEEN TWO OF THE LAYERS
COMPOSED OF METAL OR METAL ALLOY
SELECTED TO BE A COMBINATION OF
MATERIALS FROM WHICH THE LAYERS
ARE MADE WITH A COVER FILM OVER
END FACES OF THE LAYERS

BACKGROUND OF THE INVENTION

This invention relates to an electron device, and more particularly to a thin film magnetic head, a magnetic head device and a magnetic recording/reproducing device.

As reading elements currently achieved widespread use for thin film magnetic heads, there have been spin valve film structure elements (referred to herein as "SV element") using giant magnetoresistive (referred to herein as "GMR") effect films, and tunnel magnetoresistive effective elements (referred to herein as "TMR element"). An active region of the spin valve film structure is of a multilayered film structure including a soft magnetic film (free layer), a non-magnetic film, a ferromagnetic film, and an antiferromagnetic film. On both sides of the active region are passive regions of their respective multilayered film structure through which fed to the active region is sense current which flows in the direction parallel to the film surface of the active region.

In the TMR element, an active region is constructed of a ferromagnetic tunnel effective film of a multilayered structure consisting of a ferromagnetic layer, a non-magnetic layer and a ferromagnetic layer. Above and below the active region are passive regions of a multilayered film structure through which fed to the active region is sense current which flows in the direction perpendicular to the film surface of the active region.

In order to improve the sensitivities of the SV elements and the TMR elements to the external magnetic field, end faces of the multilayered film structures are exposed to the medium-facing surface of a slider. In order to insure high wear resistance, durability, corrosion resistance and insulation property of the exposed end faces and to improve their reliability, the medium-facing surface of the slider is deposited on a covering film such as a diamond-like carbon (referred to herein as "DLC").

In depositing the covering film, the medium-facing surface of the slider is cleaned by means of physical and/or chemical etching and thereafter a covering film is deposited on the cleaned surface to form a stable covering film with high adherence.

Since the SV element and TMR element are constructed of their respective multilayered film structures which are made of different materials, the ionization tendencies of the layers constructing each multilayered structure are different from one another. When cleaned, therefore, the layers of the multilayered film structure are etched by their different etching rates. A layer having a larger etching rate is etched deeply, and a layer having a smaller etching rate is etched shallowly. As a result, the end face of the multilayered film structure is etched in concave-convex shape, so the covering film can not be formed so perfectly as to cover the end face with sufficient adhesive strength. That is, remarkable difference in height occurs throughout end faces of adjacent films, so that coverage of a covering film on the end faces becomes incomplete, which in turn problematically makes insufficient the adherence strength of the covering film to the end faces.

These problems are not limited to the thin film magnetic heads. The same holds true in case of electron devices of various kinds having a multilayered film structure whose end faces are covered by a covering film attached thereto.

SUMMARY OF THE INVENTION

It is an object of the invention to provide an electron device which eliminates all the disadvantages of the prior art and which improves adherence strength of a covering film to an end face of a multilayered film structure.

In order to achieve the above objects, the present invention provides three aspects of electron devices. The electron device according to the first aspect of the invention includes a laminated film and a covering film. The laminated film includes a fist layer and a second layer. The first layer is formed of a metal or metal alloy. The second layer is formed of a metal or metal alloy different from that of the first layer and adjoins the first layer.

In an adjacent region between the first and second layers, there is provided a concentration gradient layer containing the metal or met alloy contained in the first layer and the metal or metal alloy contained in the second layer. The covering film covers end faces of the first and second layers.

The first and second layers are fundamentally formed of different metals or metal alloys which are selected from metals or metal alloys fulfilling requirements which are imposed on the electron devices. The metals or metal alloys constituting the first and second layers are different in etching rate in physical and/or chemical etching.

According to the invention, in the adjacent region between the first and second layers is formed a concentration gradient layer containing the metal or metal alloy contained in the first layer and the metal or metal alloy contained in the second layer. With this constitution, when a cleaning is carried out by etching on a surface including the end faces of the first and second layers, the end face of the concentration gradient layer is removed to form a gentle or smooth slope in section by etching correspondingly to the concentration gradient so that the end faces of these layers are etched in smoothly connected surfaces without any indentations.

Therefore, the coverage of the covering film on the end faces of the first and second layers is improved to increase the adherence strength of the covering film to the end faces of the multilayered film structures.

In the electron device according to the second aspect of the invention, a laminated film includes a first layer, a second layer and a third layer. The first layer is formed of a metal or metal alloy, while the third layer is formed of a metal or metal alloy different from that of the first layer. Therefore, the first and third layers exhibit different etching rates in cleaning by etching.

The second layer is arranged between the first and third layers and formed of a mixture of the metal or metal alloy contained in the first layer and the metal or metal alloy contained in the third layer. A covering film covers end faces of the first, second and third layers.

In the electron device according to the second aspect of the invention, the etching rate of the second layer is set to be an intermediate value between those of the fist and third layers so that the coverage of the covering film on the end faces of the first, second and third layers is improved to increase the adherence strength of the covering film to the end faces of these layers.

In an electron device according to the third aspect of the invention, a laminated film includes a first layer, a second layer and a third layer. The first layer is formed of a metal or metal alloy, while the third layer is formed of a metal or metal alloy different from that of the first layer. Consequently, the first and third layers exhibit different etching rates in cleaning by physical and for chemical etching.

The second layer is aged between the first and third layers and formed of a metal or metal alloy having an etching rate intermediate between the etching rate of a metal element whose atomic ratio is more than 40% of the first layer and whose atomic number is the maximum and the etching rate of a metal element whose atomic ratio is more than 40% of the third layer and whose atomic number is the maximum. A covering film covers end faces of the first, second and third layers.

According to the third aspect of the invention, it is possible to set the etching rate of the second layer substantially intermediate between those of the first and third layers, so that the coverage of the covering film on the end faces of the first, second and third layers is enhanced to increase the adherence strength of die covering film to the end faces of these layers.

Moreover, herein are disclosed thin film magnetic beads as practically applied examples of the first, second and third aspects of the invention, a magnetic head device as a combination of the thin film magnetic head with a head supporting device, and a magnetic recording/reproducing device as a combination of the magnetic head device with a magnetic recording medium such as a magnetic disc according to the invention.

As can be seen from the above description the present invention can provide an electron device having a covering film covering multiple film end faces, whose adherence strength to the end faces is improved.

Other and further features and advantages of the invention will be explained in more detail with reference to attached drawings illustrating preferred embodiments of the invention which are not intended to limit the invention.

BRIEF DESCRIPTION OF THE DRAWINGS

FIG. 14 is an enlarged sectional view taken along the line 14—14 in FIG. 13;

FIG. 15 is a view illustrating a furor structure of the reading element shown in FIG. 10;

DESCRIPTION OF THE PREFERRED EMBODIMENTS

Figure 1:
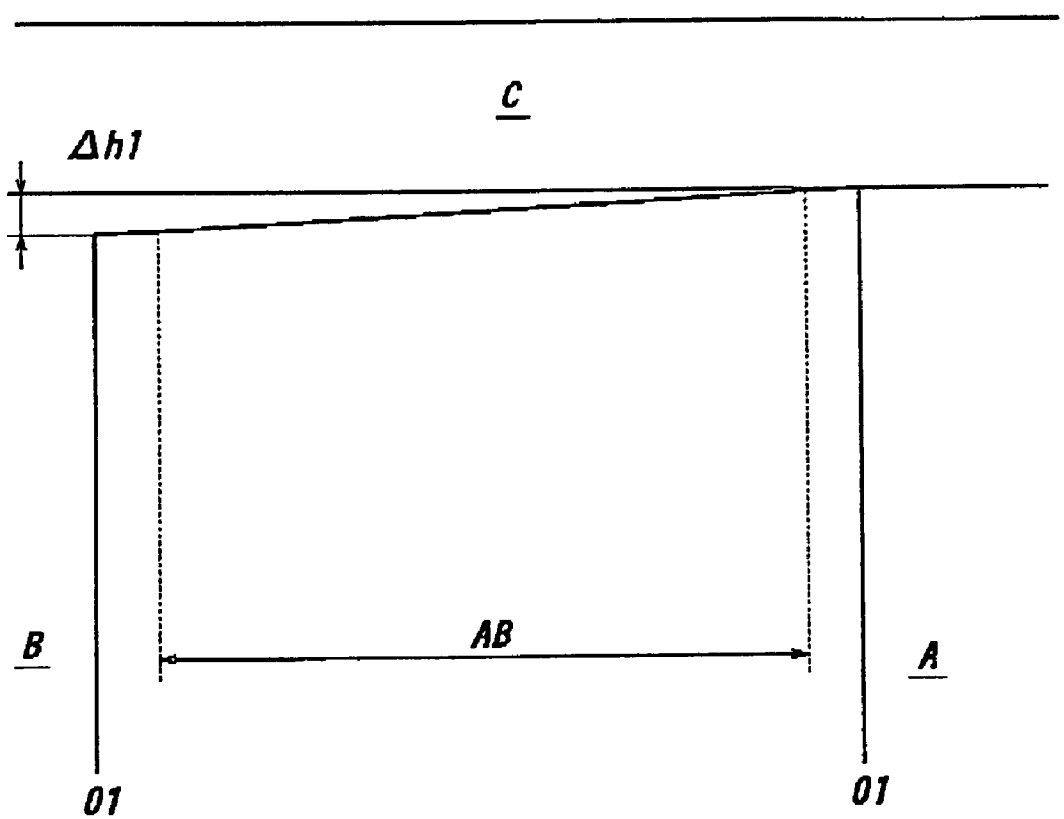
FIG. 1 is a view schematically illustrating the laminated film structure of an electron device according to the first aspect of the invention.

FIG. 1 schematically illustrates a laminated film structure of an electron device according to the first aspect of the invention. The electron device of the first aspect of the invention includes a laminated film (A and B) and a covering film C. The laminated film (A and B) includes a first layer A and a second layer B which are formed on a substrate (not shown). The first layer A is formed of a metal or a metal alloy. The second layer B is formed of a metal or a metal alloy different from the metal or alloy of the first layer A and adjoins the first layer A.

The electron device further includes in the adjacent region between the first and second layers A and B a concentration gradient layer AB including the metal or metal alloy included in the first layer A and the metal or metal alloy included in the second layer. Moreover, a covering film C covers end faces of the first and second layers A and B and may be formed of an organic or inorganic material.

As described above, the first and second layers A and B are formed of metals or metal alloys which are essentially different from each other. These metals or metal alloys are selected from those complying with the requirements imposed on electron devices and in consideration of the ionization tendencies. The metals or metal alloys forming the first and second layers A and B are different in etching rate when cleaned by physical and/or chemical etching.

A subject feature of the invention is to form the concentration gradient layer AB containing the metal or metal alloy contained in the first layer A and the metal or metal alloy contained in the second layer B. With this arrangement, in the case that a cleaning is effected by etching on the surface including the film end faces of the first and second layers A and B, the end face of the concentration gradient layer AB is removed to form a slight or gentle slope in section with the maximum depth $\Delta h1$ depending upon the concentration gradient of the layer AB, so that the etched end faces of these layers will become relatively smoothly connected surfaces.

Owing to such smoothly etched end faces without any remarkable indentations, therefore, improved is the coverage of the covering film C on the end faces of the fist and second layers A and B to increase the adherence of the covering film C to the end faces of the laminated films.

The concentration gradient layer AB has a concentration gradient within a range determined in a line analysis profile such that larger than 2.7 is a ratio (L20/L80) of a distance L20 to the location at 20% of the maximum concentration from the end at the maximum concentration for a distance L80 to the location at 80% of the maximum concentration from the end at the maximum concentration. As a result, the end face of the concentration gradient layer AB can be removed substantially straight from the layer of the lower etching rate to the layer of the higher etching rate by cleaning utilizing the reverse sputtering.

Figure 2:
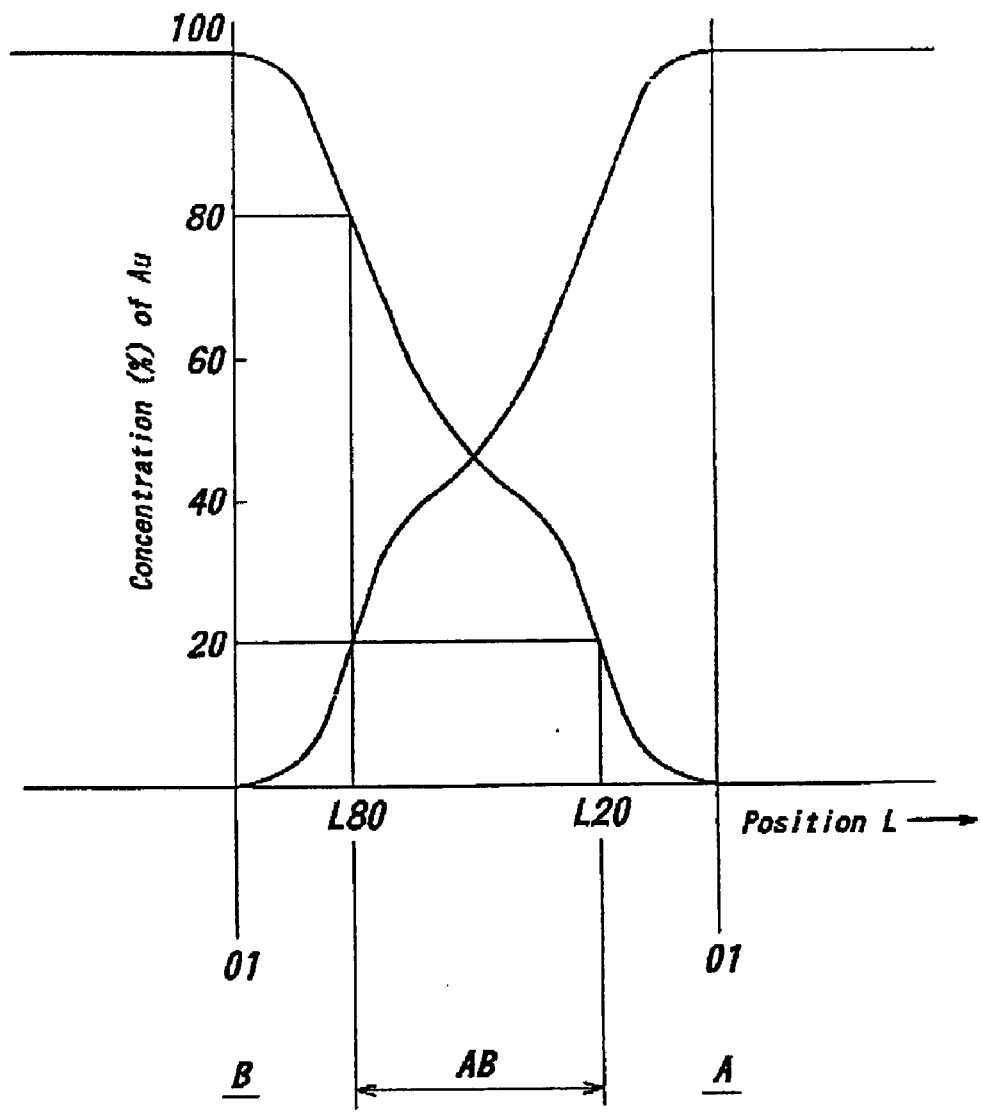
FIG. 2 illustrates a line analysis profile of a laminated film of the electron device shown in FIG. 1, which includes a first and a second layers formed of cobalt and gold, respectively.

FIG. 2 shows a line analysis profile in the case that the first layer A is formed of cobalt (Co) and the second layer B gold (Au). Such a line analysis profile can be obtained by the line analyses such as EDS, EPMA, AES and/or like. In FIG. 2, the abscissa represents the position L and the ordinate the concentration (%) of gold (Au) forming the second layer B. The origin (O) of the abscissa representing the position L is at the end 01 of the maximum concentration of the first or second layer A or B. A solid line in FIG. 2 illustrates the line analysis profile of the gold (Au) forming the second layer B, while a dot-and dash line shows the line analysis profile of the cobalt (Co) of the first layer A.

With the line analysis profile of gold (Au) shown in the solid line in FIG. 2, the concentration gradient is determined in the range such that larger than 2.7 is the ratio (L20/L80) of the distance L20 of the location at 20% of the maximum concentration from the end at the maximum concentration to the distance L80 of the location at 80% of the maximum concentration from the end at the maximum concentration. The concentration gradient concerning the cobalt (Co) is determined in the similar manner to the above. The first layer A is formed of cobalt (Co) and exhibits a lower etching rate tan that of the second layer B formed of gold (Au). In other words, the layer A is less susceptible to etching than the layer in physical etching.

Figure 3:
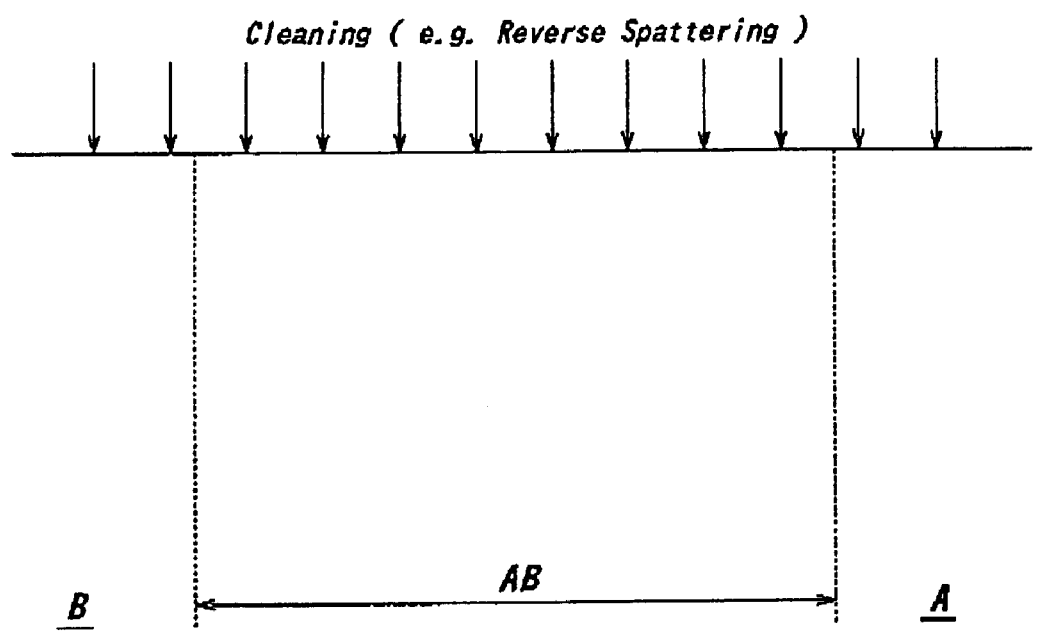
FIG. 3 is a view for explaining a cleaning process effected to obtain the electron device shown in FIG. 1.
Figure 4:
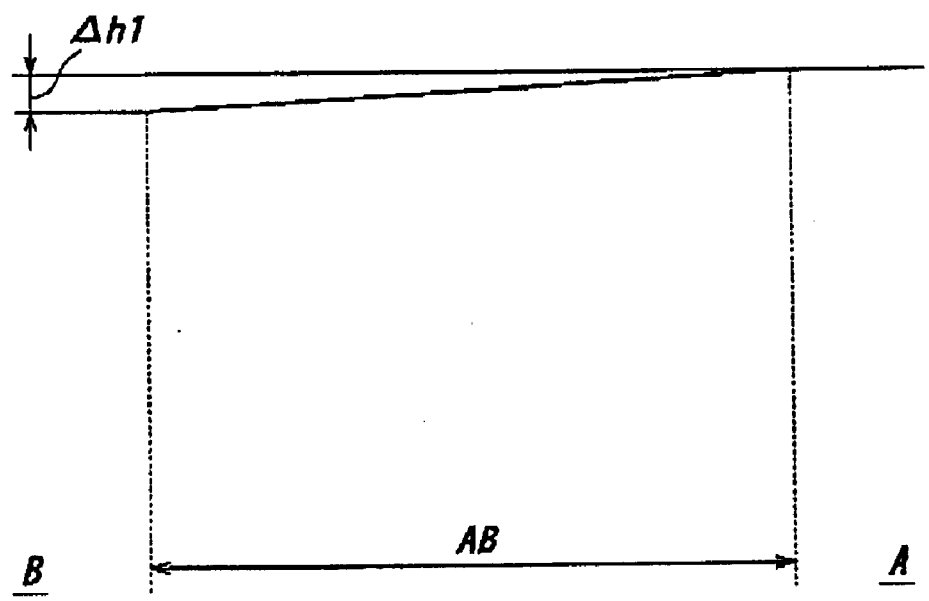
FIG. 4 is a view illustrating a condition created by the cleaning shown in FIG. 3.

In the case that a cleaning by reverse sputtering or the like is carried out as shown in FIG. 3 on the end faces of the laminated film having the line analysis profile shown in FIG. 2, the end face of the concentration gradient layer AB is removed substantially straight from the first layer A formed of cobalt (Co) exhibiting a lower etching rate toward the second layer B formed of gold (An) in physical etching, exhibiting a higher etching rate with the maximum etched depth of $\Delta h1$ as shown in FIG. 4. In this case, the cleaning method is not limited to the reverse sputtering but may be other physical and/or chemical etching methods as described above.

Figure 5:
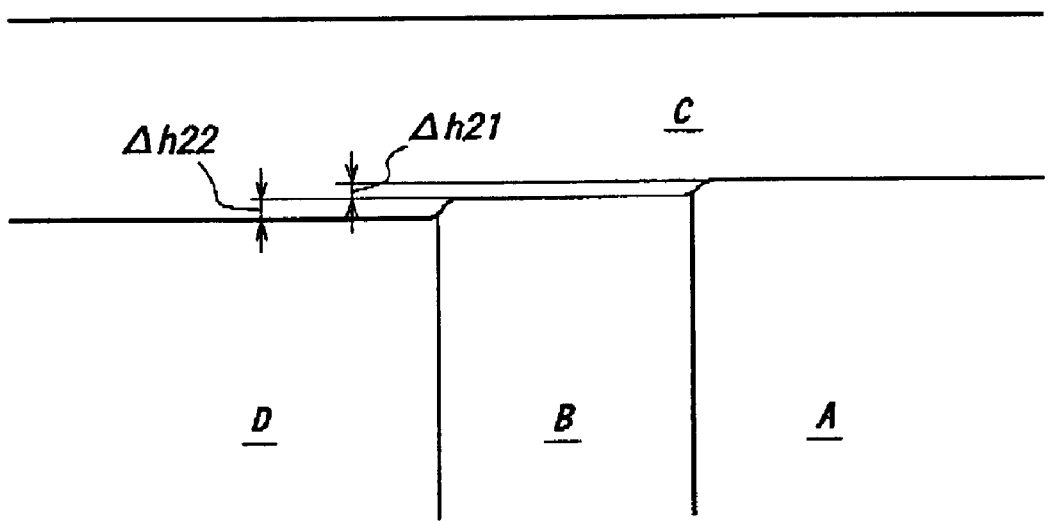
FIG. 5 is a view schematically illustrating a laminated film structure of an electron device according to the second aspect of the invention.

FIG. 5 schematically illustrates the laminated film structure of an electron device according to the second aspect of the invention. In the electron device according to the second aspect of the invention, the laminated film (A, B and D) includes a first layer A, a second layer B and a third layer D.

The fist layer A is formed of a metal or a metal alloy, while the third layer D is formed of a metal or metal alloy different from that of the first layer A. These metals or metal alloys exhibit different etching rates for cleaning by chemical etching. Realistically mentioning, their ionization tendencies become greater in the order of the third layer D, the second layer B and the first layer A. The metals or metal alloys of the first and third layers A and D are selected from metals or metal alloys complying with the requirements imposed on electron devices to be obtained and in consideration of the ionization tendencies.

The second layer B is arranged between the first and third layers A and D and formed of a mixture of the metals or metal alloys contained in the first and third layers A and D. Therefore, the second layer B necessarily has an ionization tendency intermediate between those of the first and third layers A and D without refusing the requirements imposed on electron devices. A covering film C covers the end faces of the first, second and third layers A, B and D. The covering film C is formed of an organic or inorganic material.

Figure 6:
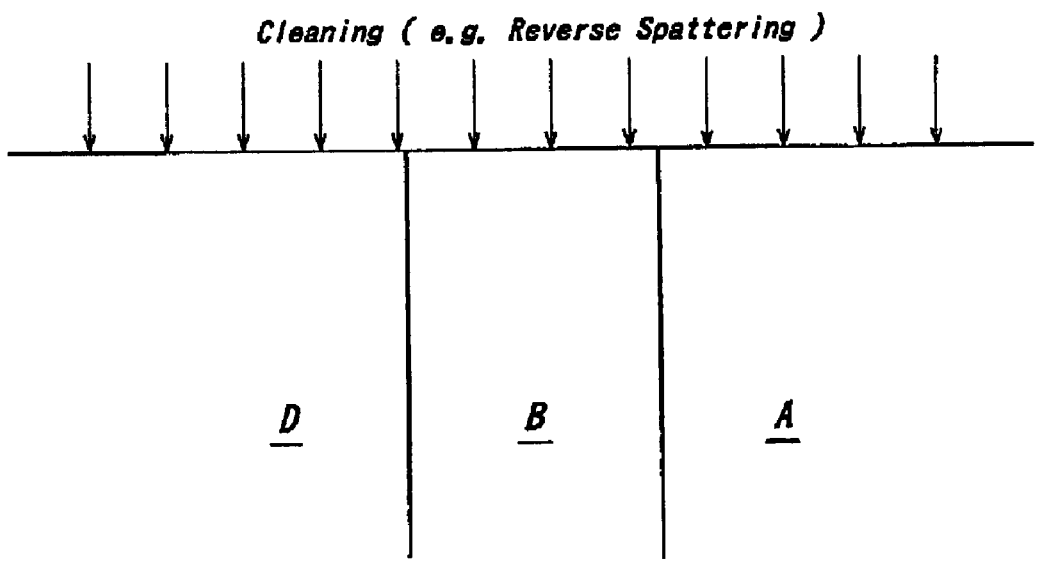
FIG. 6 is a view for explaining a cleaning process effected to obtain the electron device shown in FIG. 5.
Figure 7:
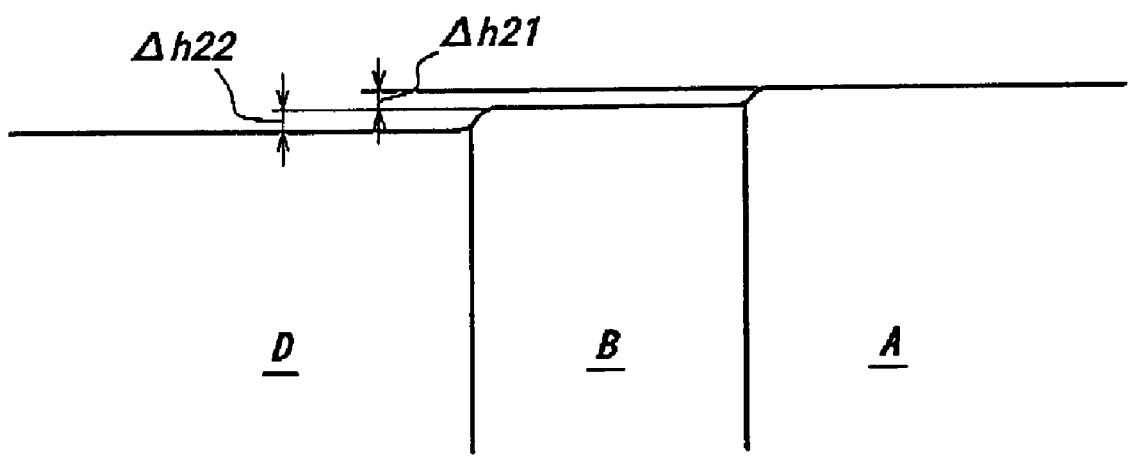
FIG. 7 is a view illustrating a condition created by the cleaning shown in FIG. 6.

In the electron device according to the second aspect of the invention, the etching rate of the second layer B is set to be substantially intermediate between those of the first and third layers A and D. In the event that a cleaning by reverse sputtering or the like is carried out on end faces of the layers as shown in FIG. 6, therefore, the second layer B is etched deeper than the first layer A by $\Delta h21$, while the third layer D is etched deeper than the second layer B by $\Delta h22$. With such stepwise or gradually etched portions, when the covering film C is applied to the end faces of the layers A, B and D as shown in FIG. 5, improved is the coverage of the covering film C on the end faces of the first, second and third layers A, B and D to increase the adherence strength of the covering film C to the end faces of these layers.

The laminated film structure of an electron device according to the third aspect of the invention is fundamentally similar to that of the second aspect of the invention shown in FIG. 5, with the exception that the metal or metal alloy of the second layer B arranged between a first and a third layer A and D has an etching rate of physical etching intermediate between those of metal elements whose atomic ratios are more than 40% of the first and third layers A and D and whose atomic numbers are the maximum, respectively. A covering film C covers the first, second and third layers A, B and D.

According to the third aspect of the invention, the etching rate of the second layer B can be set to be substantially intermediate between those of the first and third layers A and D, so that improved is the coverage of the cover film C on the end faces of the first, second and third layers A, B and D to increase the adherence strength of the covering film C to the end faces of these layers.

Actually applied examples of the first, second and third aspects of the invention described above will be explained hereinafter, which are a thin film magnetic head, a magnetic head device as a combination of the thin film magnetic head with a head supporting device, and a magnetic recording/reproducing device as a combination of the magnetic head device with a magnetic recording medium such as a magnetic disc or the like.

Figure 8:
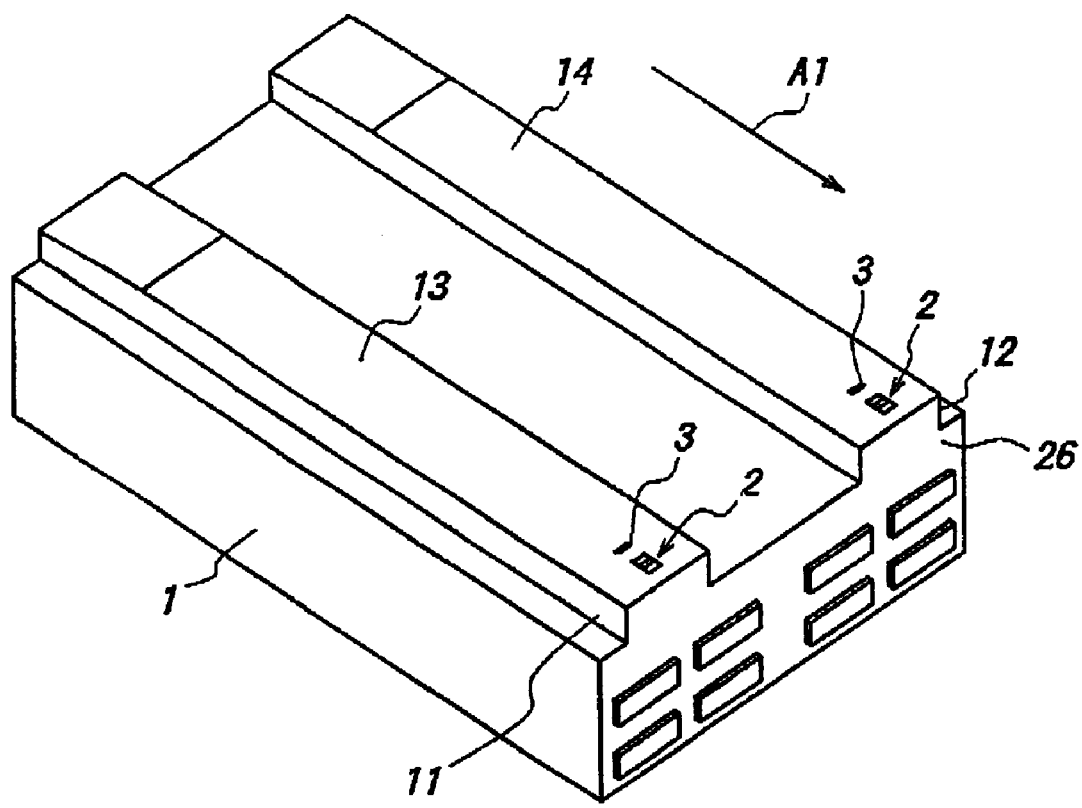
FIG. 8 is a perspective view of thin film magnetic head according to the invention.
Figure 9:
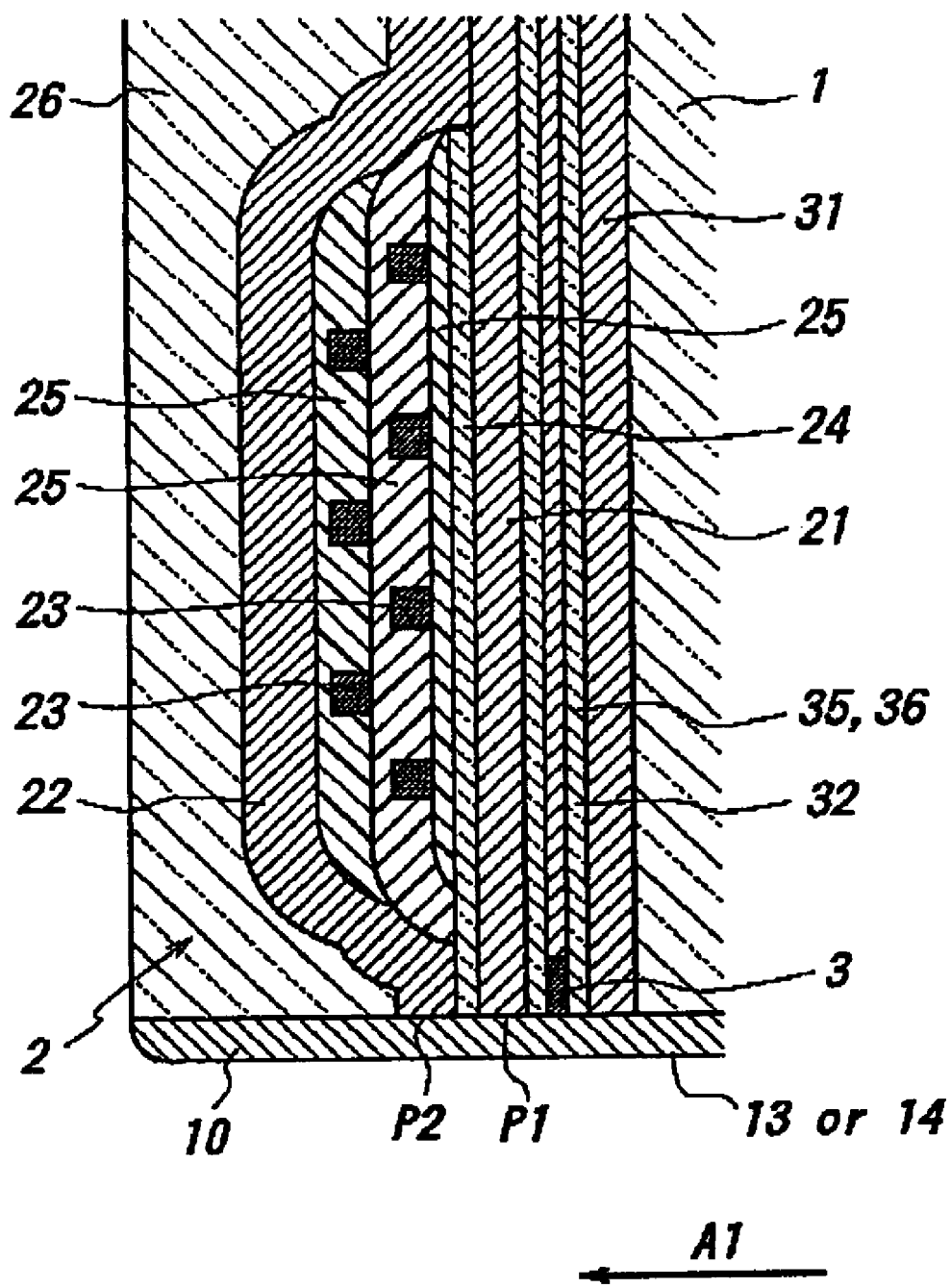
FIG. 9 is an enlarged sectional view of the thin film magnetic head shown in FIG. 8.

FIG. 8 is a perspective view of a thin film magnetic head, while FIG. 9 is an enlarged sectional view of the thin film magnetic head shown in FIG. 8. The thin film magnetic head shown in the drawing includes reading elements 3 supported by a slider 1 and writing elements 2 which are inductive type magnetic converting elements. An arrow A1 denotes the direction in which the medium runs.

The slider 1 is made of a ceramic structural material and is provided with a base body 31 made of $Al_2O_3$—TiC or the like and an insulating film 32 made of $Al_2O_3$, $SiO_2$ or the like thereon. The slider 1 has a covering film 10 on its medium-facing surface in opposition to the magnetic disc. The covering film 10 functions as a protective film and made of diamond like carbon (referred to hereinafter as "DLC") or the like. The surface of the covering film 10 functions as air bearing surfaces (referred to hereinafter as "ABSs") 13 and 14. The ABSs 13 and 14 may be formed with a variety of geometrical shapings (not shown) for the purpose of improving the floating characteristics. In the illustrated embodiment, the slider 1 includes two positive pressure producing rails 11 and 12 on the side in opposition to the magnetic disc. Alternatively, the rails 11 and 12 may have a negative pressure producing function.

The writing element 2 has a bottom magnetic film 21, a top magnetic film 22, coil films 23, a gap film 24 made of alumina or the like, insulating films 25, the covering film 10 and the like. The bottom and top magnetic films 21 and 22 have respective distal ends forming poles P1 and P2 which are opposite to each other through the gap film 24 having a minute thickness, the poles P1 and P2 performing writing. The bottom and top magnetic films 21 and 22 are connected to each other at a back gap portion on the opposite side of the poles P1 and P2 to complete a magnetic circuit. The coil films 23 are formed in the insulating films 25 so as to surround in the form of spirals around the back gap portion. Although the configuration of a longitudinal recording/reproducing magnetic head is described as above, the present invention may be applied for a perpendicular recording/reproducing magnetic head.

Figure 10:
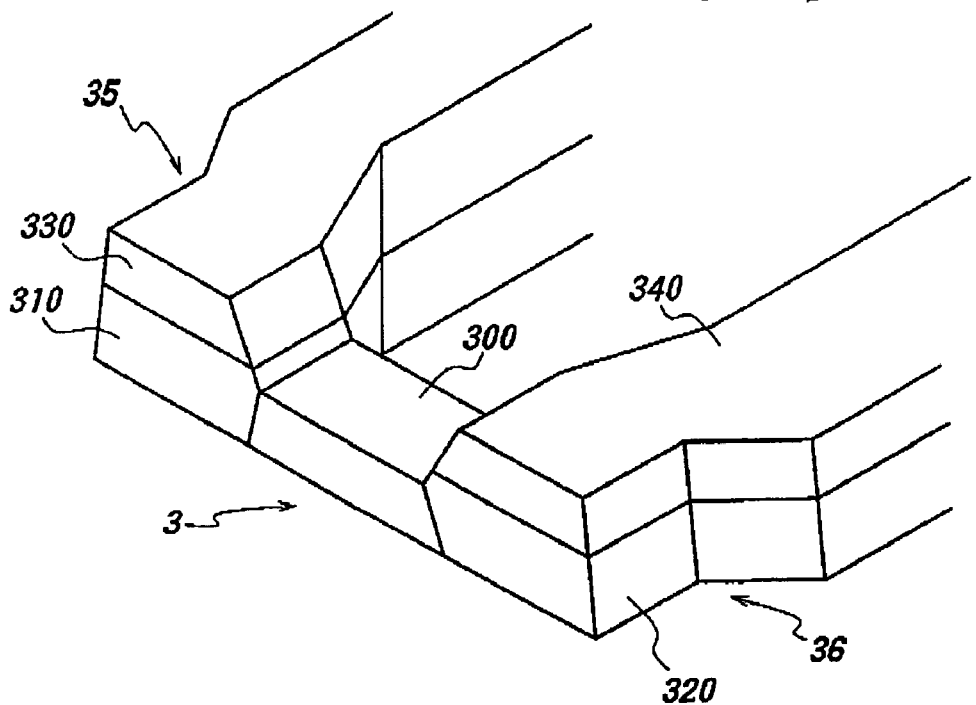
FIG. 10 is an enlarged perspective view of part of a reading element included in the thin film magnetic head shown in FIGS. 8 and 9.
Figure 11:
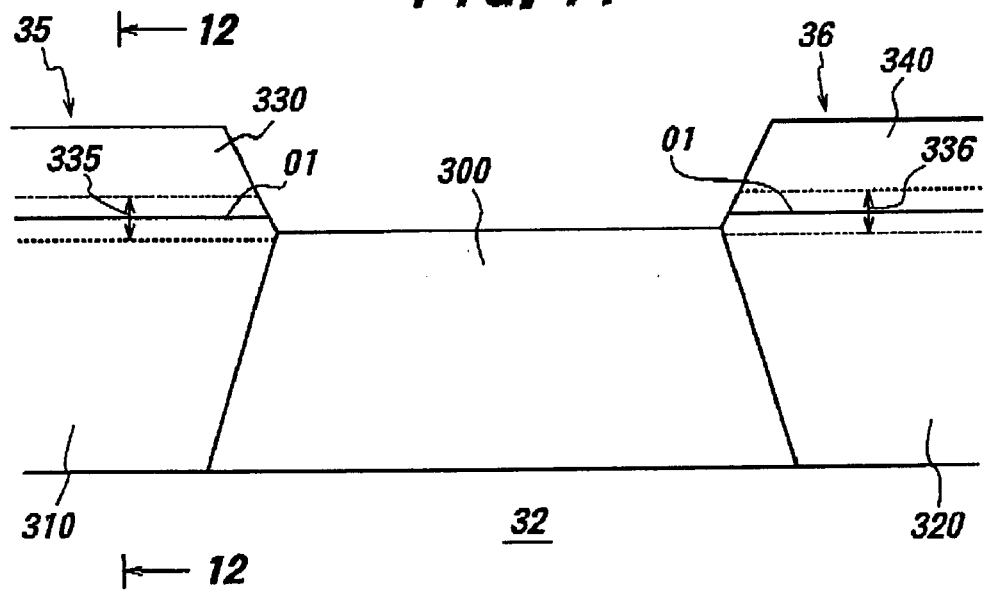
FIG. 11 is a view illustrating the structure of the reading element shown in FIG. 10.
Figure 12:
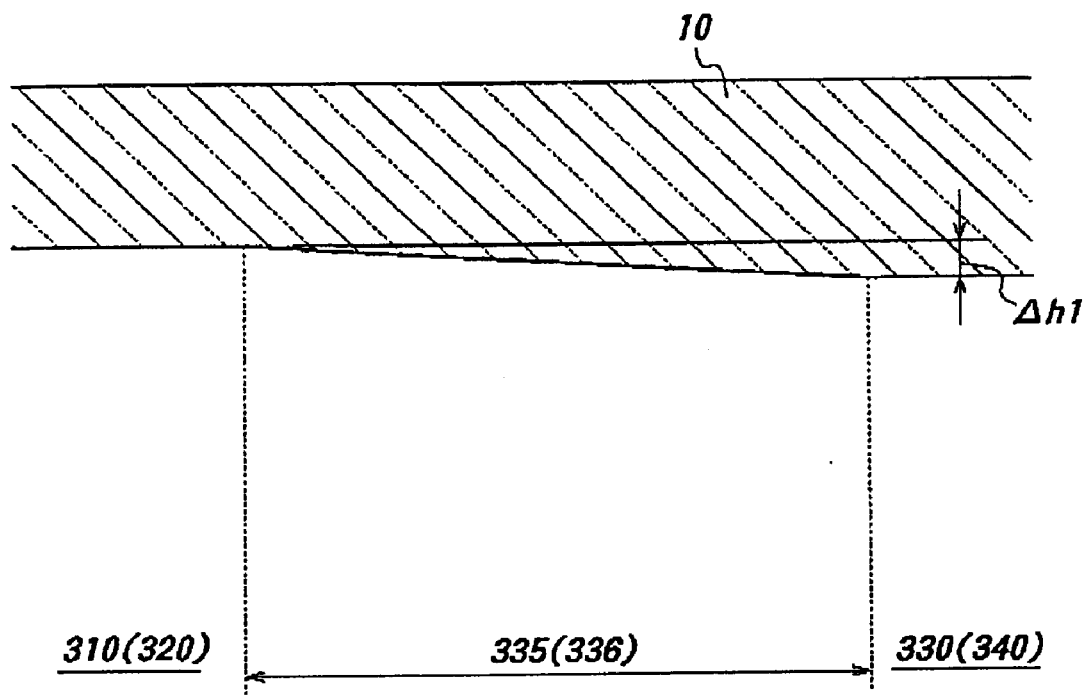
FIG. 12 is an enlarged sectional view taken along the line 12—12 in FIG. 11.

FIG. 10 is an enlarged perspective view of part of the reading element, while FIG. 11 is a view illustrating the detailed structure of the reading element shown in FIG. 10. FIG. 12 is an enlarged sectional view taken along the line 12—12 in FIG. 11. These drawings illustrate the application of the first aspect of the invention.

The reading element 3 is embedded in the insulating film 32. The reading element 3 includes a magnetoresistive effective element which in turn includes an active region 300 and passive regions 35 and 36. The illustrated active region 300 is a spin valve film structure, and the passive regions 35 and 36 are connected to opposite sides of the active region 300, respectively. The passive regions 35 and 36 include magnetic domain controlling films 310, 320 and leading electrode films 330, 340, respectively. The leading electrode films 330 and 340 supply a sense current to the active region 300, and the magnetic domain controlling films 310 and 320 control the magnetic domain of the active region 300 to restrain the Barkhausen noise.

The magnetic domain controlling films 310 and 320 are layers of a metal or metal alloy different from those of the leading electrode films 330 and 340 and adjoin the leading electrode films 330 and 340, respectively. The end faces of the magnetic domain controlling films 310 and 320 are flush with the medium-facing surface of the slider 1 which is in opposition to the magnetic disc. The leading electrode films 330 and 340 are layers of metals or metal alloys whose end faces are flush with the medium-facing surface of the slider 1.

In the adjacent regions of the magnetic domain controlling films 310 and 320 and the reading electrode films 330 and 340, there are provided concentration gradient layers 335 and 336, respectively, which contain the metals or metal alloys contained in the magnetic domain controlling fins 310 and 320 and the reading electrode films 330 and 340.

The active region 300 may be a TMR element. In this case, the leading electrode film 330 and 340 are provided above and below the active region 300.

A covering film 10 is secured to the medium-facing surface of the slider 1 to cover the end faces of the magnetic domain controlling films 310 and 320 and the leading electrode films 330 and 340. As described above, the covering film 10 is a protective film and is formed by a DLC film or the like.

With this arrangement, when a cleaning by etching is effected on the surface including the end faces of the magnetic domain controlling films 310 and 320 and the leading electrode films 330 and 340, the end faces of the concentration gradient layers 335 and 336 are removed to form a slight or gentle slope in section with the maximum depth $\Delta h1$ depending on the concentration gradient (FIG. 12). Therefore, improved is the coverage of the covering film 10 on the magnetic domain controlling films 310 and 320 and the leading electrode films 330 and 340 to increase the adherence strength of the covering film 10 to the end faces of these films.

As exemplarily illustrated in FIG. 2, in a line analysis profile, the concentration gradients of the concentration gradient layers 335 and 336 are determined in such a manner that larger than 2.7 is a ratio (L20/L80) of a distance L20 of the location at 20% of the maximum concentration from the end at the maximum concentration to a distance L80 of the location at 80% of the maximum concentration from the end of the maximum concentration.

The magnetic domain controlling films 310 and 320 may be formed by a hard magnetic film (magnet film) or antiferromagnetic film. Adoptable hard magnetic materials include CoPt, CoPtCr, SmCo, NbFeB and the like. In reality, the antiferromagnetic film forming the magnetic domain controlling films 310 and 320 can contain at least one selected from films of, for example, IrMn, FeMn, NiMn, PtMn, RuMn, RhMn, RuRhMn, PtPdMn, NiO, and PtCr.

The materials of the leading electrode films 330 and 340 are so determined that the concentration gradient layers 335 and 336 as exemplarily shown in FIG. 2 is realized in consideration of the materials of the magnetic domain controlling films 310 and 320. In typical example, the magnetic domain controlling films 310 and 320 are hard magnetic films formed of CoPt, while the leading electrode films 330 and 340 are formed of Au. In this case, the concentration gradient layers 335 and 336 according to the line analysis profile shown in FIG. 2 can be obtained.

Figure 13:
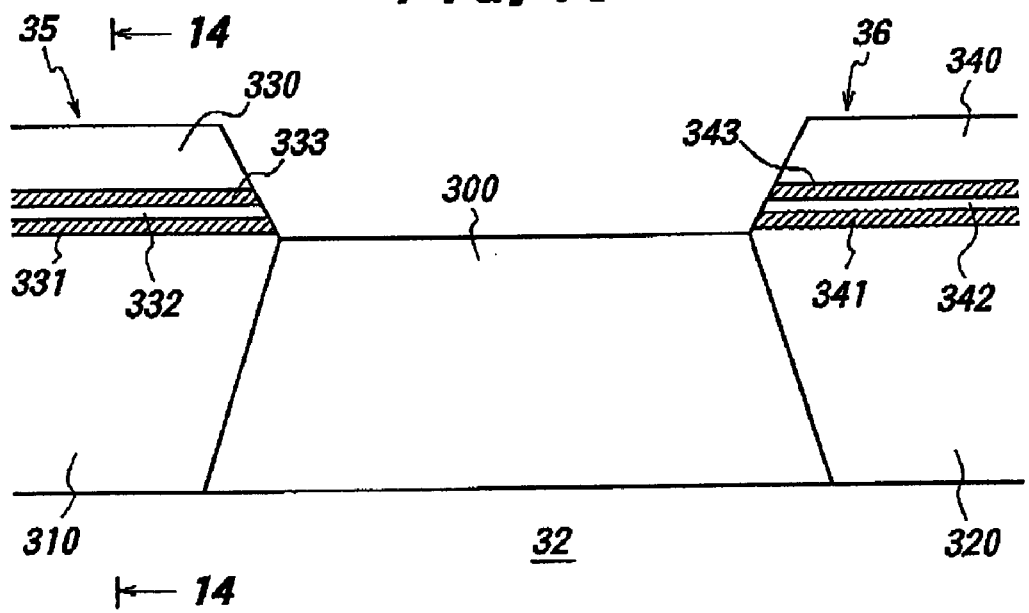
FIG. 13 is a view illustrating another structure of the reading element shown in FIG. 10.

FIG. 13 is a view illustrating the structure of the leading element shown in FIG. 10, while FIG. 14 is an enlarged sectional view of the element taken along the line 14—14 in FIG. 13. These drawings illustrate an application of the second aspect of the invention. In these drawings, components similar to those in FIGS. 10 to 12 are designated by the same reference numerals used in FIGS. 10 to 12.

In the embodiment shown in FIGS. 13 and 14, a passive region 35 includes a magnetic domain controlling film 310 and a leading electrode film 330, and further includes in the adjacent region between these films 310 and 330 a laminated film comprising a first layer 331, a second layer 332 and a third layer 333 laminated in this order. Likewise, a passive region 36 includes a magnetic domain controlling film 320 and a leading electrode film 340 and further includes in the adjacent region between these films 320 and 340 a laminated film comprising a first layer 341, a second layer 342 and a third layer 343 laminated in this order. The passive regions 35 and 36 are in the similar structure as described above, so that the passive region 35 only will be typically explained hereinafter.

The fist layer 331 is formed of a metal or metal alloy, while the third layer 333 is formed of a metal or metal alloy different from that of the first layer 331. The second layer 332 is aged between the first layer 331 and the third layer 333 and formed of a mixture of the metal or metal alloy of the first layer 331 and the metal or metal alloy of the third layer 333. A covering film 10 covers the end faces of the first, second and third layers 331, 332 and 333 (FIG. 14).

Practical examples of the first, second and third layers 331, 332 and 333 will be explained hereinafter. With a typical example that the magnetic domain controlling film 310 is formed of CoPt, and the leading electrode film 330 is formed of Au, there is an example that the first layer 331 is formed of CoPtTa, the third layer 333 AuTa and the second layer 332 Ta.

In this case, the etching rate of the second layer 332 is selected to be a substantially intermediate value between those of the first and third layers 331 and 333. Consequently, in the event that a cleaning as by reverse sputtering is carried out on end faces of the layers, the second layer 332 is etched deeper than the first layer 331 by a depth Δh31, while the third layer 333 is etched deeper than the second layer 332 by a depth Δh32 as shown in FIG. 14. As a result of such stepwise or gradually etched end faces, improved is the coverage of the covering film 10 to the end faces of the first second and third layers 331, 332 and 333, so that the adherence strength of the covering film 10 on the end faces of the layers increases.

In the embodiment now being explained, the magnetic domain controlling film 310 is formed of CoPt to which the first layer 331 formed of CoPtTa is adjacent, to which the second layer 332 formed of Ta is in turn adjacent so that the etching rate of the first layer 331 of CoPtTa is set to be a substantially intermediate value between those of the magnetic domain controlling film 310 of CoPt and the second layer 332 of Ta. Therefore, when a cleaning as by reverse sputtering is carried out on end faces of the layers, the first layer 331 is etched deeper than the magnetic domain controlling film 310, while the third layer 333 is etched deeper than the second layer 332 (refer to reference numerals 333, 331 and 310 in brackets in FIG. 14). Owing to such stepwise or gradually etched end faces, improved is the coverage of the covering film 10 on the end faces of the magnetic domain controlling film 310 and the first and second layers 331 and 332, so that the adherence strength of the covering film 10 to the end faces of the layers increases.

Furthermore, as the leading electrode film 330 is formed of Au to which the third layer 333 of AuTa is adjacent to which the second layer 332 of Ta is in turn adjacent, the etching rate of the third layer 333 formed of AtTa is set to be a substantially intermediate value between those of the leading electrode film 330 of Au and the second layer 332 of Ta. Consequently, in the event that cleaning as by reverse sputtering is carried out on the end faces of the layers, the third layer 333 is etched deeper than the second layer 332, while the leading electrode film 330 is etched deeper than the second layer 332 (refer to reference numerals 330, 332 and 333 in brackets in FIG. 14).

Owing to such stepwise or gradually etched end faces, improved is the coverage of the covering film 10 on the end faces of the magnetic controlling film 310 and the first and second layers 331 and 332 to increase the adherence strength of the covering film 10 to the end faces of these layers.

In the embodiment, therefore, the difference in height between the laminated layers is reduced in the entire passive region 35, so that the coverage of the covering film 10 is improved to increase the adherence strength of the covering film 10 to the end faces of these layers. The same effects hold true in case of the passive region 36.

In the case that the magnetic domain controlling films 310 and 320 are formed of CoPtCr and the leading electrode films 330 and 340 are formed of Au, the same materials as those of the magnetic domain controlling and the leading electrode films can be used for the first, second and third layers 331, 332 and 333. In the case that the magnetic controlling films 310 and 320 are formed of CoPt or CoPtCr and the leading electrode films 330 and 340 are formed of Ta, there is an example that the first layer 331 is formed of CoPtCrTiW, the third layer 333 TiWTa and the second layer 332 TiW.

With the laminated structure of the first layer 331 (or 341), the second layer 332 (or 342) and the third layer 333 (or 343), as the third aspect of the invention, in the event that the second layer 332 (or 342) is formed of a metal or metal alloy having an etching rate intermediate between those of metal elements whose atomic ratios are more than 40% of the first and third layers 331 (or 341) and 333 (or 343) and whose atomic numbers are the maximum, respectively, the game functions and effects hold true in this case.

FIG. 15 is an enlarge sectional view of a reading element used in the thin film magnetic head according to the invention. In this embodiment the second aspect of the invention is applied to the magnetic domain controlling films 310 and 320. The magnetic domain controlling film 310 includes a laminated film comprising a first layer 311, a second layer 312, a third layer 313 and a fourth layer 314 laminated in succession.

Similarly, the magnetic domain controlling film 320 in the passive region 36 has a laminated film comprising a first layer 321, a second layer 322, a third layer 323 and a fourth layer 324 laminated in succession. The passive regions 35 and 36 are identical in structure with each other, so that the passive region 35 only will be typically explained hereinafter.

The first layer 311 is a layer of a metal or metal alloy, while the third layer 313 is a layer of a metal or metal alloy different from that of the first layer 311. The second layer 312 is arranged between the first layer 311 and the third layer 313 and is formed of a mixture of the metals or metal alloys contained in the first layer 311 and the third layer 313.

Further, the fourth layer 314 is arranged between the third layer 313 and the magnetic domain controlling film 310 and is formed of a mixture of the metals or metal alloys contained in the third layer 313 and the magnetic domain controlling film 310. A practical example of the magnetic domain controlling film 310 formed of CoPt or CoPtCr will be explained.

Example 1

First layer 311; Ta
Second layer 312; CrTa
Third layer 313; Cr or Alloy containing Cr
Fourth layer 314; CoPtCr
Magnetic domain controlling film; CoPt In this Example, the etching rate of the second layer 312 is set to be a substantially intermediate value between those of the first layer 311 and the third layer 313, while the etching rate of the fourth layer 314 is set to be a substantially intermediate value between those of the third layer 313 and the magnetic domain controlling film 310. Consequently, in the event that a cleaning as by reverse sputtering is carried out on end faces of the layers, the respective layers are etched stepwise or gradually with small or fine differences in etched depth so that when a covering film 10 is attached to the end faces of these layers, the coverage of the covering film 10 on the entire magnetic domain controlling film 310 is improved to increase the adherence strength of the covering film 10.

Example 2

First layer 311; TiW
Second layer 312; CoPt+TiW

Third layer 313; None
Fourth layer 314; None
Magnetic domain controlling film 310; CoPt or CoPtCr+ TiW In the Example, the etching rate of the second layer 312 is set to be a substantially intermediate value between those of the first layer 311 and the magnetic domain controlling film 310.

Example 3

First layer 311; NiCr
Second layer 312; CoPt+NiCr
Third layer 313; None
Fourth layer 314; None
Magnetic domain controlling film 310; CoPt or CoPtCr In this Example, the etching rate of the second layer 312 is also set to be a substantially intermediate value between those of the first layer 311 and the magnetic domain controlling film 310. Although explanation omitted, the magnetic domain controlling film 320 is also constructed of a similar multilayered film structure to the one of the magnetic domain controlling film 310, so that the same function and effect can be exhibited.

Figure 16:
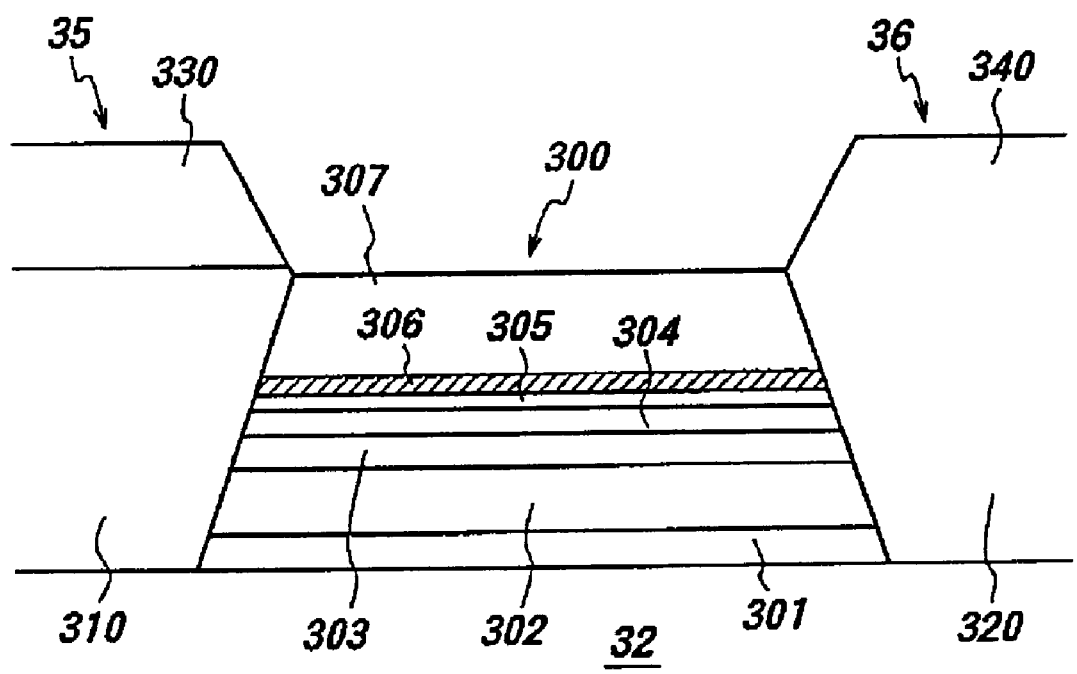
FIG. 16 is a view illustrating still a further structure of the reading element shown in FIG. 10.

FIG. 16 is an enlarged sectional view of a leading element used in a thin film magnetic head according to the invention. In this embodiment, the second aspect of the invention is applied to the active region 300.

The active region 300 is constructed of a spin valve film structure. In this embodiment as one example of the spin valve film structure, spin valve film structure includes an underfilm 301 formed of a tantalum (Ta) film, a soft magnetic film 302 formed of a NiFe film, a ferromagnetic film 303 of CoFe, a non-magnetic film 304 formed of a Cu film, a ferromagnetic film 305, a first layer 306 and an antiferromagnetic film 307.

The antiferromagnetic film 307 can be formed of well known composition materials. Typically, alloys containing Mn or compounds containing Mn, an oxide, PtCr may be exemplified. Examples of the manganese containing alloys are PtMn, IrMn, FeMn, RhMn, NiMn, RuMn, RuRhMn, PtPdMn and the like. Examples of the oxide are NiO, CoO, $Fe_2O_3$ and the like.

The ferromagnetic film 305 is formed so as to be adjacent to the anti-ferromagnetic film 307, to be bonded with exchange interaction thereto. As a result, the magnetization of the film 305 is fixed in a direction M2. In other words, the antiferromagnetic film 307 serves as a pinning layer, while the ferromagnetic film 305 serves as a pinned layer.

In the above arrangement, the first layer 306 is arranged between the ferromagnetic film 305 and the antiferromagnetic film 307 and is formed of a mixture of the metals or metal alloys contained in the ferromagnetic film 305 and the antiferromagnetic film 307. Actual examples are as follows.

Example 4

Antiferromagnetic film 307; PtMn
Ferromagnetic film 305; CoFe
First layer 306; PtMn+CoFe In this Example, the etching rate of the first layer 306 is set to be a substantially intermediate value between those of the antiferromagnetic film 307 and the ferromagnetic film 305.

Example 5

Antiferromagnetic film 307; PtMn
Ferromagnetic film 305; CoFe
First layer 306; Ta or Ru In this Example, the etching rate of the first layer 306 is also set to be a substantially intermediate value between those of the antiferrromagnetic film 307 and the ferromagnetic film 305.

According to the Examples 4 and 5, consequently, in the event that a cleaning as by reverse sputtering is carried out on the end faces of the active region 300, the film end faces of the antiferromagnetic film 307, the first layer 306 and the ferromagnetic film 305 are etched stepwise with slight differences in height or in smooth slope surfaces, so that when a covering film 10 is secured to the film end faces, the coverage of the covering film 10 on the active region 300 is improved to increase the adherence strength of the covering film 10.

Figure 17:
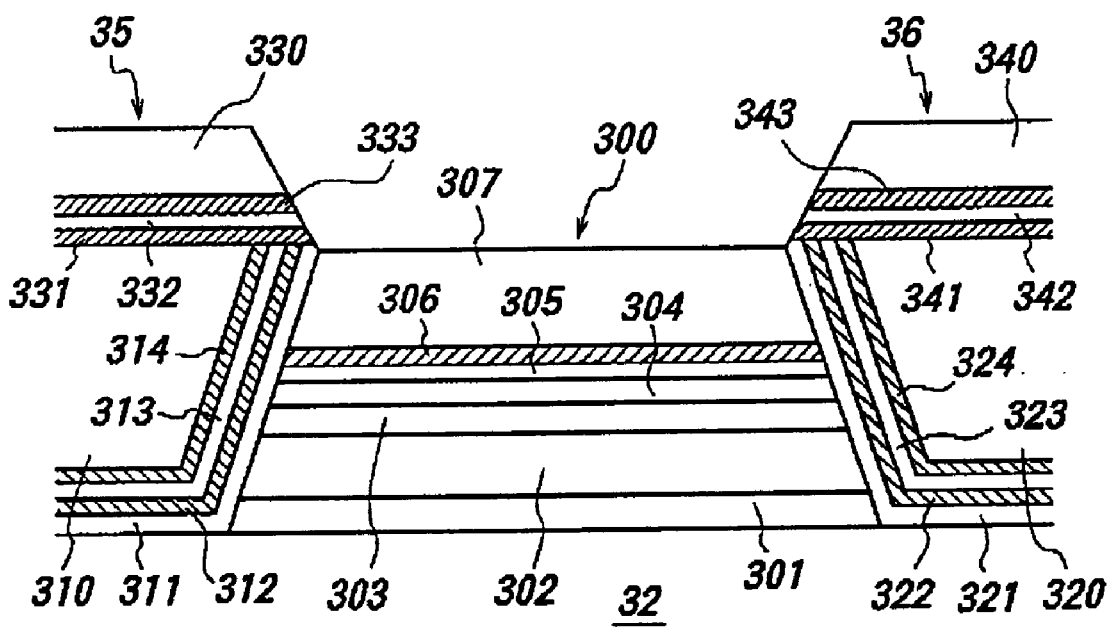
FIG. 17 is a view illustrating a further structure of the reading element shown in FIG. 10.

FIG. 17 is an enlarged sectional view of a reading element used in a thin film magnetic head according to the invention. This embodiment is a combination of the embodiments shown in FIGS. 13 to 16 and includes an active region 300 and end regions 35 and 36 illustrating examples to which the second aspect of the invention is applied. However, the first and third aspects of the invention are also applicable to the embodiment shown in FIG. 17, such an explanation is omitted herein.

Figure 18:
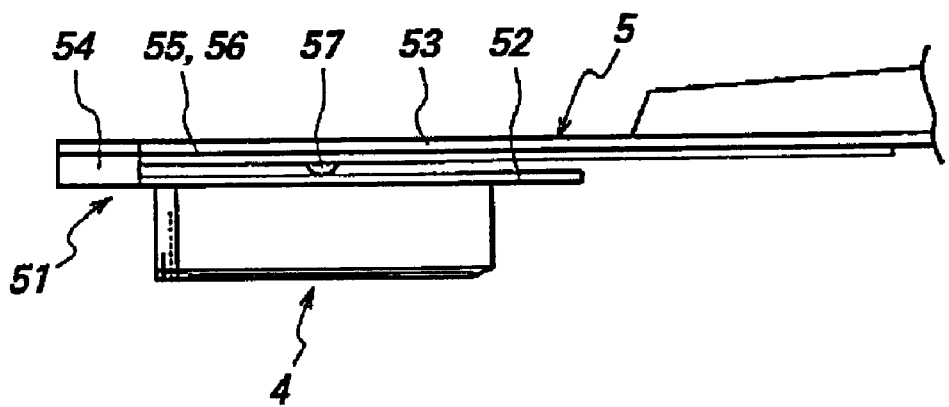
FIG. 18 is a front elevation illustrating part of a magnetic head according to the invention.
Figure 19:
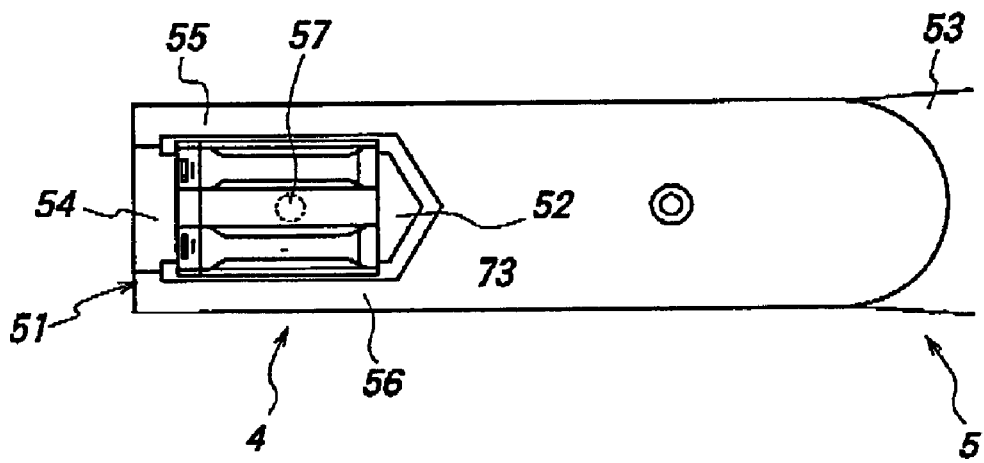
FIG. 19 is a bottom plan view of the magnetic head device shown in FIG. 18.

FIG. 18 is a front elevation illustrating part of a magnetic head device according to the invention. FIG. 19 is a bottom plan view of the magnetic head device shown in FIG. 18. The magnetic head device includes a thin film magnetic head 4 and a head supporting device 5. The thin film magnetic head 4 is equivalent to those according to the invention described by referring to FIGS. 8 to 15.

The head supporting device 5 comprises a supporting member 53 made of a metal plate and a flexible member 51 attached to the longitudinal free end of the supporting member 53. The thin film magnetic head 4 is supported by and attached to the bottom surface of the flexible member 51.

The flexible member 51 includes two outer frame members 55 and 56 extending substantially in parallel with the longitudinal axis of the supporting member 53, a traverse frame member 54 connecting the outer frame members 55 and 56 at their one ends remote from the supporting member 53, and a tongue-shaped piece 52 having one free end and extending from the traverse frame member 54 at its substantially mid portion substantially in parallel with the outer frame members 55 and 56.

The supporting member 53 is provided with a hemispherical load transmitting protrusion 57 extending therefrom at a location corresponding substantially to the center of the tongue-shaped piece 52 for the purpose of transmitting a load from the free end of the supporting member 53 to the tongue-shaped piece 52.

The thin film magnetic head 4 is secured to the bottom surface of the tongue-shaped piece 52 as by an adhesive. The thin film magnetic head 4 is attached to the tongue-shaped piece 52 so that its air outflowing side is to be on the side of the traverse frame member 54. The head support 5 applicable to the present invention should not be limited to the specific features in the illustrated embodiment.

Figure 20:
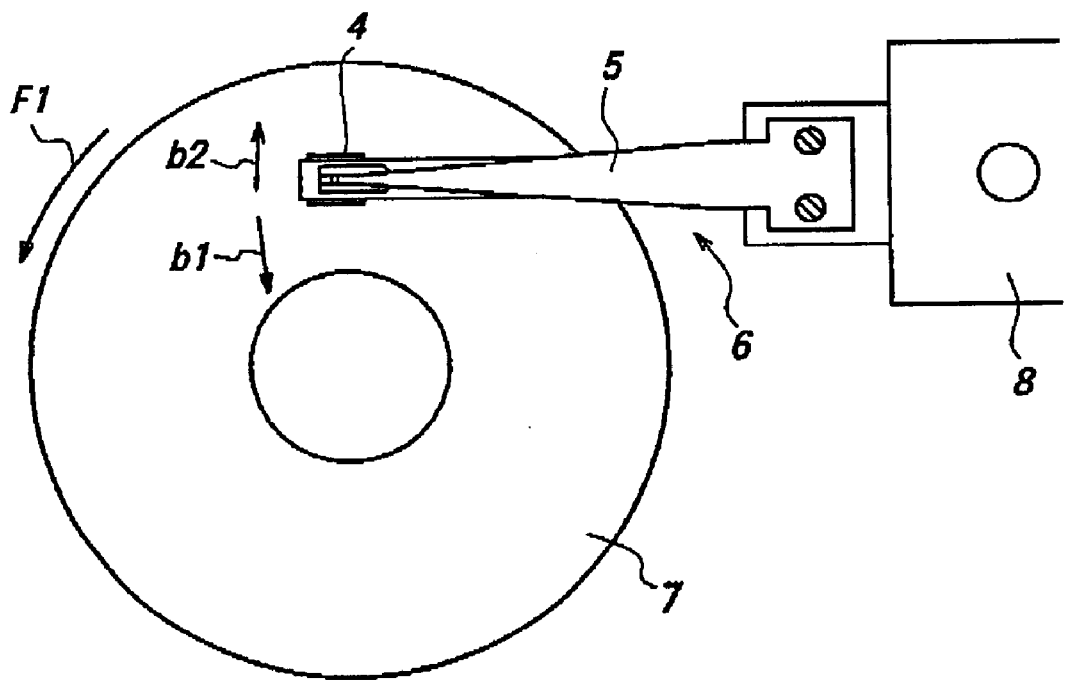
FIG. 20 is a view schematically illustrating a construction of the magnetic disc device according to the invention.

FIG. 20 schematically illustrates the construction of a magnetic disc device according to the invention. The illustrated magnetic disc device includes a magnetic head device 6 and a magnetic disc 7. The magnetic head device 6 is the same as that shown in FIGS. 17 and 18. The magnetic head device 6 is supported at one end of its head supporting device 5 and driven by an position-determining device 8. The thin film magnetic head 4 of the magnetic head device is supported by the head supporting device 5 and arranged so as to face to the magnetic recording surface of the magnetic disc 7.

When the magnetic disc 7 is rotationally driven in the direction shown by an arrow F1 by means of driving means (not shown), the thin film magnetic head 4 is floated slightly above the surface of the magnetic disc 7. The magnetic disc device shown in FIG. 20 is driven by the so-called rotary actuator driving system in such a manner that the thin film magnetic head 4 mounted on the distal end of the head supporting device 5 is driven in a radial direction b1 or b2 of the magnetic disc 7 by means of the position-determining device 8 which is adapted to rotationally drive the head supporting device 5 until the thin film magnetic head 4 is positioned at a predetermined track position on the magnetic disc 7, thereby performing magnetic recording or reading thereon.

While the invention has been practically shown and described with reference to preferred embodiments thereof, it will be apparent to those skilled in the art that many modifications and variations of the present invention are possible on the basis of the light of the above teaching and the technical spirit of the present invention.

What is claimed is:

1. An electron device including a laminated film and a covering film, said laminated film including a first layer and a second layer, said first layer formed of a metal or metal alloy, and said second layer formed of a metal or metal alloy different from the metal or metal alloy of said first layer, and said second layer adjoining said first layer, further including in a region adjoining said first and second layers a concentration gradient layer containing a metal or metal alloy contained in said first layer and a metal or metal alloy contained in said second layer, and said covering film covering end faces of said first and second layers.

2. The electron device as set forth in claim 1 wherein said concentration gradient layer has a concentration gradient within a range determined in a line analysis profile of said metals or metal alloys such that larger than 2.7 is a ratio (L20/L80) of a distance L20 to the location at 20% of the maximum concentration from the end at the maximum concentration for a distance L80 to the location at 80% of the maximum concentration from the end of the maximum concentration.

3. The electron device as set forth in claim 1 wherein said end faces of said laminated film have been treated by cleaning.

4. An electron device including a laminated film and a covering film, said laminated film including a first layer a second layer and a third layer, said first layer formed of a metal or metal alloy, said third layer formed of a metal or metal alloy different from the metal or metal alloy of said first layer, said second layer arranged between said first and third layers and formed of a mixture of a metal or metal alloy of the first layer and a metal or metal alloys of the third layer; and said covering film covering end faces of said first, second and third layers.

5. A thin film magnetic head including a slider, a magnetic converting element and a covering film, said slider having a medium-facing surface, said magnetic converting element including a magnetoresistive effective element and mounted on said slider with its end face being on said medium-facing surface of said slider, said magnetoresistive effective element including an active region and a passive region, said passive region connected to said active region, at least one of said passive and active regions including a laminated film, said laminated film including a first layer, a second layer and a third layer, said first layer formed of a metal or metal alloy, said third layer formed of a metal or metal alloy different from that of said first layer, said second layer arranged between said first and third layers and formed of a mixture of a metal or metal alloy contained in said first layer and a metal or metal alloy contained in said third layer; and said covering film covering end faces of said first, second and third layers.

6. A thin film magnetic head including a slider, a magnetic converting element and a covering film, said slider having a medium-facing surface, said magnetic converting element including a magnetoresistive effective element and mounted on said slider with its end face being on said medium-facing surface of said slider, said magnetoresistive effective element including an active region and a passive region, said passive region connected to said active region, at least one of said passive and active regions including a laminated film, said laminated film including a first layer and a second layer, said first layer formed of a metal or metal alloy with its end face being on said medium-facing surface of said slider, said second layer formed of a metal or metal alloy different from that of the first layer and adjoining said first layer with its end face of being on said medium-facing surface of said slider; and further including in a region adjoining said first and second layers a concentration gradient layer containing a metal or metal alloy contained in said first layer and a metal or metal alloy contained in said second layer; and said covering film being attached to said medium-facing surface of said slider and covering the end faces of said first and second layers.

7. The thin film magnetic head as set forth in claim 6 wherein said concentration gradient layer has a concentration gradient within a range determined in a line analysis profile of said metals or metal alloys such that larger than 2.7 is a ratio (L20/L80) of a distance L20 to the location at 20% of the maximum concentration from the end at the maximum concentration for a distance L80 to the location at 80% of the maximum concentration from the end of the maximum concentration.

8. The thin film magnetic head as set forth in claim 6 wherein said passive region includes two leading electrode films which include said laminated film and are connected to said active region.

9. The thin film magnetic head as set forth in claim 6 wherein said passive region has a magnetic domain controlling film, and said magnetic domain controlling film includes said laminated film to control the magnetic domain in said active region.

10. The thin film magnetic head as set forth in claim 6 wherein said active region constitutes a spine valve film structure.

11. The thin film magnetic head as set forth in claim 6 wherein said active region constitutes a ferromagnetic tunnel junction.

12. The thin film magnetic head as set forth in claim 6 wherein said magnetoresistive effective element is a reading element.

13. The thin film magnetic head as set forth in claim 12 wherein said magnetic head further includes at least one writing element.

14. A magnetic head device including a thin film magnetic head and head supporting device, wherein said thin film magnetic head is one as set forth in claim 6, and said head supporting device supports said thin film magnetic head to permit pitching movement and rolling movement of said thin film magnetic head.

15. A magnetic recording/reproducing device including a magnetic head device and a magnetic recording medium, wherein said magnetic head device is one as set forth in claim 14, and said magnetic recording medium is magnetically written and read with said magnetic head device.

* * * * *